United States Patent
Tomlinson et al.

(10) Patent No.: US 9,438,589 B2
(45) Date of Patent: *Sep. 6, 2016

(54) BINDING A DIGITAL FILE TO A PERSON'S IDENTITY USING BIOMETRICS

(71) Applicants: Martin Tomlinson, Devon (GB); Cen Jung Tjhai, London (GB); Andersen Cheng, London (GB)

(72) Inventors: Martin Tomlinson, Devon (GB); Cen Jung Tjhai, London (GB); Andersen Cheng, London (GB)

(*) Notice: Subject to any disclaimer, the term of this patent is extended or adjusted under 35 U.S.C. 154(b) by 139 days.

This patent is subject to a terminal disclaimer.

(21) Appl. No.: 14/245,584

(22) Filed: Apr. 4, 2014

(65) Prior Publication Data

US 2015/0172286 A1    Jun. 18, 2015

Related U.S. Application Data

(63) Continuation-in-part of application No. 13/865,844, filed on Apr. 18, 2013, now Pat. No. 9,166,957.

(30) Foreign Application Priority Data

Apr. 19, 2012    (GB) .................................. 1206863.1

(51) Int. Cl.
   *H04L 29/06*    (2006.01)
   *H04L 9/32*    (2006.01)
   *G06F 21/64*    (2013.01)

(52) U.S. Cl.
   CPC .......... *H04L 63/0861* (2013.01); *G06F 21/64* (2013.01); *H04L 9/321* (2013.01); *H04L 9/3231* (2013.01); *H04L 9/3239* (2013.01);
   (Continued)

(58) Field of Classification Search
   CPC ............. H04L 63/0861; H04L 9/3239; H04L 63/0428; H04L 9/3247; H04L 63/123; H04L 9/3231; G06F 21/64; G06F 21/32; H04I 63/0861
   See application file for complete search history.

(56) References Cited

U.S. PATENT DOCUMENTS

| 6,202,151 B1* | 3/2001 | Musgrave ............. G06Q 20/04 713/170 |
| 6,904,525 B1* | 6/2005 | Berson ................. G06K 19/086 705/59 |

(Continued)

FOREIGN PATENT DOCUMENTS

| DE | 102008029608 A1 | 12/2009 |
| GB | 2456509 A | 7/2009 |

(Continued)

OTHER PUBLICATIONS

Combined Search and Examination Report under Sections 17 & 18(3) for related application No. GB 1206863.1, dated Jun. 19, 2012, in 5 pages.

(Continued)

*Primary Examiner* — Hadi Armouche
*Assistant Examiner* — Sher A Khan
(74) *Attorney, Agent, or Firm* — Procopio, Cory, Hargreaves & Savitch LLP

(57) ABSTRACT

A method and system are described for authenticating one or more digital files in which a feature, characteristic or a portion of the contents of said files is implanted into one or more biometric information files, which are electronically recorded and transmitted and in which the identity of the originator or a trusted third party and all or part of the feature, characteristic or a portion of the contents of said files is determined from said biometric information files.

15 Claims, 12 Drawing Sheets

(52) U.S. Cl.
CPC ......... *H04L9/3247* (2013.01); *H04L 63/0428* (2013.01); *H04L 63/0823* (2013.01); *H04L 63/123* (2013.01)

(56) References Cited

U.S. PATENT DOCUMENTS

| | | | |
|---|---|---|---|
| 7,606,768 B2 | 10/2009 | Graubart et al. | |
| 7,689,832 B2 | 3/2010 | Talmor et al. | |
| 8,060,922 B2 | 11/2011 | Crichton et al. | |
| 8,935,532 B2* | 1/2015 | Mittal | G06F 21/10 380/281 |
| 2003/0012415 A1* | 1/2003 | Cossel | G06F 21/32 382/124 |
| 2003/0182585 A1 | 9/2003 | Murase et al. | |
| 2003/0200217 A1* | 10/2003 | Ackerman | G06F 21/32 |
| 2005/0015457 A1* | 1/2005 | Warasawa | H04L 12/58 709/207 |
| 2005/0065824 A1* | 3/2005 | Kohan | G06F 19/322 705/3 |
| 2007/0217649 A1* | 9/2007 | Lowe | H04N 1/32144 382/100 |
| 2008/0229110 A1* | 9/2008 | Balfanz | H04L 9/3263 713/176 |
| 2009/0070587 A1* | 3/2009 | Srinivasan | G10L 19/018 713/176 |
| 2009/0254836 A1* | 10/2009 | Bajrach | G11B 27/105 715/745 |
| 2009/0287732 A1* | 11/2009 | Hofer | H04L 63/0428 |
| 2011/0047190 A1* | 2/2011 | Lee | H04L 67/1095 707/803 |
| 2011/0072500 A1* | 3/2011 | Varghese | G06F 21/32 726/7 |
| 2011/0075883 A1* | 3/2011 | Shaffer | H04M 3/523 382/100 |
| 2011/0283243 A1* | 11/2011 | Eckhardt | G06F 3/04886 715/865 |
| 2012/0240045 A1* | 9/2012 | Bradley | G10L 13/04 715/716 |
| 2013/0006642 A1* | 1/2013 | Saxena | G10L 17/00 704/273 |
| 2013/0054965 A1* | 2/2013 | Catrein | G06F 21/10 713/167 |
| 2013/0227076 A1* | 8/2013 | Conley | H04L 21/00 709/219 |

FOREIGN PATENT DOCUMENTS

| | | |
|---|---|---|
| GB | 2473154 A | 3/2011 |
| WO | 0223796 A1 | 3/2002 |
| WO | 02080116 A1 | 10/2002 |

OTHER PUBLICATIONS

Menezes et al. "Handbook of Applied Cryptography." Chapter 8, "McEliece public key encryption," pp. 283-319. CRC Press, Oct. 1996. Retrieved from http://www.cacr.math.uwaterloo.ca/hac/about/chap8.pdf.
Rivest et al. "A Method for Obtaining Digital Signatures and Public-Key Cryptosystems." Communications of the ACM 21(2):120-126 (1978).
FIPS PUB 186-3, Digital Signature Standard (DSS), Federal Information Processing Standards Publication. Jun. 2009, 131 pages.
McEliece. "A Public-Key Cryptosystem Based on Algebraic Coding Theory." DSN Progress Report 42-44. pp. 114-116 (Jan. and Feb. 1978).

* cited by examiner

BINDING A DIGITAL FILE TO A PERSON'S IDENTITY USING BIOMETRICS

CROSS-REFERENCE TO RELATED APPLICATIONS

This application is a continuation-in-part of application Ser. No. 13/865,844 filed on Apr. 18, 2013, which claims priority under 35 U.S.C. §119 to United Kingdom patent application GB 1206863.1 filed on Apr. 19, 2012, all of which are hereby incorporated by reference.

FIELD OF THE INVENTION

This invention relates to data encryption and communication, and more particularly to systems and methods for improved verification of parties involved.

BACKGROUND OF THE INVENTION

Providing proof that a digital file was originated by a particular user and has not been tampered with since or substituted with a forgery is not an easy problem to solve. Digital files of particular importance are public keys, the public domain part of asymmetric encryption keys since more than one confidential information file is likely to be encrypted using these. If a public key is a forgery, the forger will hold the corresponding private key and be able to access all of the confidential information encrypted.

Authentication of public keys is traditionally done using certificates whereby a trusted third party (TPA) acts as a Certification Authority (CA) and publishes public keys and their associated owner's identities (ID's) in the form of certificates. These certificates are digitally signed using the private key of the CA so that the authenticity of a certificate may be checked by anyone using the public key of the CA.

The binding of the ID with the public key is the critical issue. There are several problems with the CA approach. A central server has to be constantly available, accessible under varying traffic conditions and hacker proof. Strict security procedures need to be followed by the CA to check ID's before issuing each certificate. Also procedures need to be in place to prevent tampering of certificates. The CA has to have credible trustworthiness. Apart from checking the digital signature a user cannot directly verify the associated ID of a public key.

The specification below describes a method in which a recipient can authenticate by themselves a public key (or any digital file) and the associated ID by using biometric information and provides multi-factor authentication as recommended by government regulators (for example the US Federal Financial Institutions Examination Council). The multi-factors are something known (a secret number or password), something owned (a device, a computer or piece of equipment) and various types of biometric information. The prior art describes different authentication methods from the specification with this aim. As described in U.S. Pat. No. 7,606,768 B2 by Graubart et al [1], the originator of a document generates a voice message which includes their ID and a secret number, a PIN. The voice message is appended to the document to form a data file. A polynomial hash of the data file is calculated and encrypted using the PIN as the basis of the encryption key. The recipient is able to authenticate the originator's ID by recognising the originator's voice in the voice message. The document is bound to the originator through the PIN encrypted hash. Provided the PIN is kept secret, a forger cannot change the document without invalidating the encrypted hash.

The disadvantage of this method described in U.S. Pat. No. 7,606,768 B2 is that while the biometric content provides strong binding to the originator's ID, the binding to the document is weak in that if a forger is able to learn the PIN then the forger can replace the document with a forged document, calculate a new encrypted hash and utilise the originator's voice message to provide authentication.

In the method described below a document is bound to the originator by making the biometric authentication information a function of the document which is not the case for U.S. Pat. No. 7,606,768 B2.

Moreover, much of current day electronic communications involves digital files and in the case of encrypted communications the encryption and decryption keys are usually stored as digital files. In many applications it is necessary to bind one or more digital files to the identity of an individual who is designated as the originator, owner or administrator of said files. An example of particular importance is the binding of a public encryption key or any shared secret to an individual to prevent impersonations such as Man In The Middle (MITM) attacks.

Conventional identity authentication systems are generally known, implementing different methods with this general aim. For example, US2003/0182585 (Murase and Marada) discusses a technique whereby the digital file is a password and it is associated with an identity by means of the same password written by hand similar to a handwritten signature.

There is a need in some cases to provide an association, a binding of a person's identity with one or more digital files by using biometrics. An example is that of a photograph taken by an individual in which the individual wishes to take the credit for the photograph.

SUMMARY

Aspects of the present invention are set out in the accompanying claims.

According to one aspect of the present invention, a method is provided of authenticating a digital file associated with a transmitting entity, the method comprising implanting at least a portion of content from a digital data file into one or more associated biometric information files, and transmitting the digital file and the associated one or more biometric information files to a recipient, whereby the implanted content is determined from said received one or more biometric information files for verification, and the identity of the transmitting entity is determined by the recipient from the received one or more biometric information files.

The content that is implanted into said one or more biometric information files may be encoded using a codebook look up table, where a symbol or sequence of symbols is used to describe said content.

The one or more biometric information files may comprise an audio or video recording of a person communicating said at least a portion of content. Alternatively or additionally, the one or more biometric information files may comprise one or more captured images of a person communicating said at least a portion of content. The at least a portion of content may be implanted into one or more biometric information files by enunciating or writing said content, or by hand or body gestures representative of said content.

The digital data file may be a public encryption key, and a defined portion of said public encryption key may be implanted into said one or more biometric information files.

The implanted portion of the public encryption key and the identity of the entity associated with the public encryption key from said received one or more biometric information files may be verified before allowing encryption of data using said received public encryption key.

The encrypted data may comprise electronic data messages transmitted between respective messaging applications of host devices. The one or more biometric information files may be generated using a microphone and/or camera of the host device to record the implanted content.

The biometric information files may be stored in a server for retrieval by the recipient of the associated digital data file. The digital file may comprise the one or more biometric information files used for authentication, to form a nested authentication arrangement whereby successive trusted third parties provide biometric information files which may be used to provide additional authentication.

According to another aspect of the present invention, a method is provided of authenticating one or more digital files in which a feature or characteristic of the contents of said files is implanted into one or more biometric information files, which are electronically recorded and transmitted and in which the identity of the originator or a trusted third party and all or part of the feature or characteristic of the contents of said files is determined from said biometric information files.

According to yet another aspect, the present invention provides a method of masking the identity of an entity transmitting an electronic data message to a receiving entity, comprising generating a random identifier for the transmitting entity, linking the random identifier to an associated biometric information file for the transmitting entity, transmitting a data message to the receiving entity, the data message including the random identifier, displaying the received encrypted data message and the associated random identifier, and outputting the biometric information file associated with the random identifier, from which the identity of the transmitting entity is determined.

The biometric information file may be retrieved from a remote server. The transmitted data message may be a data message encrypted using the receiving entity's public key, and wherein the biometric information file is generated by the transmitting entity implanting at least a portion of the public key into the biometric information file.

In further aspects, the present invention provides a system comprising means for performing the above methods. In yet other aspects, there is provided a computer program arranged to carry out the above methods when executed by a programmable device.

The above aspects of the present invention provide an association or a binding of one or more digital files containing text information and images such as document files, or video sequence files or other digital media to the identity of an individual which may be determined from a biometric file which is stored or transmitted with said media files. Preferably, some features or characteristics of the information contained in these files or characteristics of the files themselves are described in a biometric information file which is generated such that the identity of an individual may be also determined. The recipient of said biometric information file and the media files is thereby able to confirm the association of the identity of the originator of the biometric file with the media files.

BRIEF DESCRIPTION OF THE DRAWINGS

There now follows, by way of example only, a detailed description of embodiments of the present invention, with references to the figures identified below.

FIG. 7, which comprises

DETAILED DESCRIPTION OF EMBODIMENTS OF THE INVENTION

Figure 1:
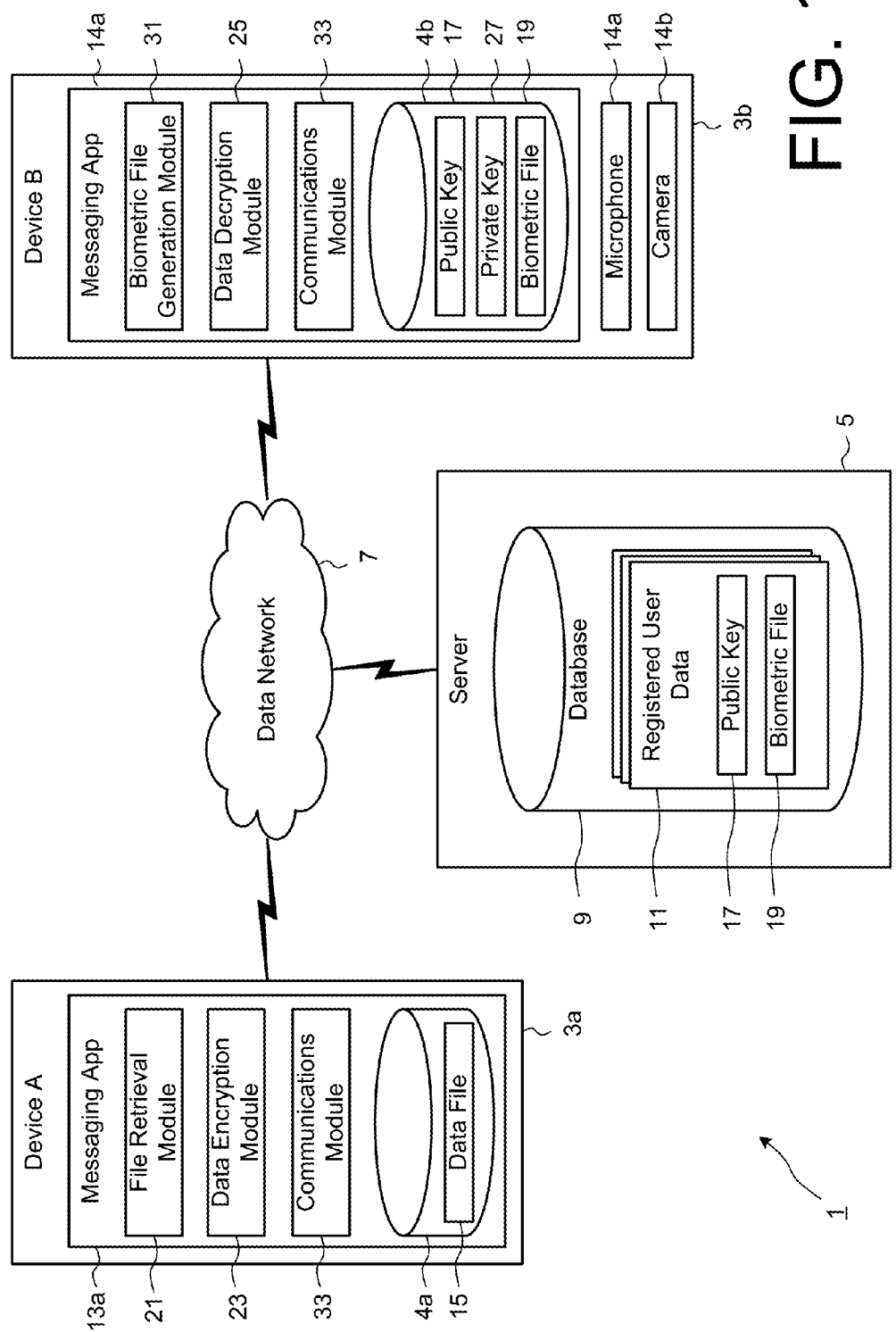
FIG. 1 is a block diagram showing the main components of a data communication system according to an embodiment of the invention.

A specific embodiment of the invention will now be described for a process of transmitting encrypted documents using a verified public key. Referring to FIG. 1, a data communication system 1 according to the present exemplary embodiment comprises a first device 3a in communication with a second device 3b via a server 5 and a data network 7. The devices 3 are associated with respective registered users of the system 1, the server 5 storing data 9 identifying each registered user in a database 11.

The devices 3 may be of a type that is known per se, such as a desktop computer, laptop computer, a tablet computer, a smartphone such as an iOS, Blackberry or Android based smartphone, a 'feature' phone, a personal digital assistant (PDA), or any processor-powered device with suitable input and display means. The data network 7 may comprise a terrestrial cellular network such as a 2G, 3G or 4G network, a private or public wireless network such as a WiFi-based network and/or a mobile satellite network or the Internet. It will be appreciated that a plurality of devices 3 are operable concurrently within the system 1.

In the present embodiment, each device 3 has a respective secure messaging application 13 for communicating encrypted data, such as one or more data files 15 stored in a memory 4a and/or electronic messages input by a user, with other devices 3 connected to the network 7, via the server 5. In the example illustrated in FIG. 1, the first device 3a (Device A) is associated with a first registered user, Alice, and the second device 3b (Device B) is associated with a second registered user, Bob. In order for Alice to send a message to Bob, device A 3a is configured to access the database 9 on the server 5 to obtain Bob's public encryption key 17 in order to encrypt her message prior to sending it to device B 3b.

Device A 3a is also configured to access a biometric information file 19, such as a video recording, generated by Bob using his messaging app 13b and a microphone 14a and/or camera 14b of the host device 3. By replaying the video recording on her messaging app 13a, Alice is able to identify Bob to make sure that he is indeed the person she wishes to communicate with and also to confirm that she has the correct public key for Bob and not the public encryption key of an impersonator or an interceptor, a Man in the Middle. Alice is able to authenticate the identity of Bob by recognising him as the person in the video recording, for example by recognising his face, voice, distinctive gestures, reading his lips, etc.

Figure 2:
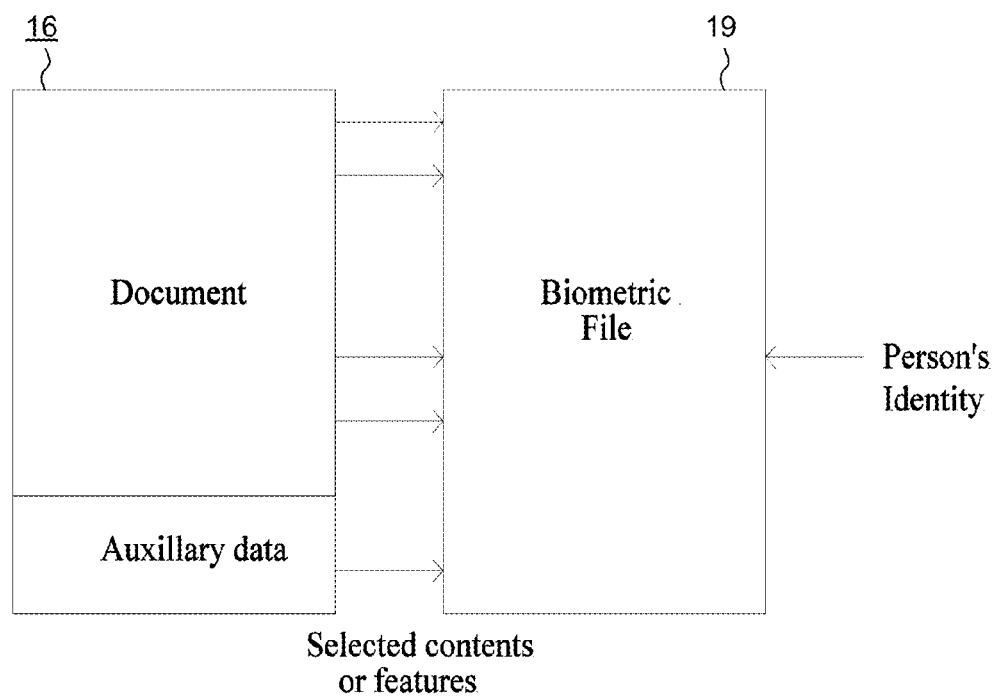
FIG. 2 is a block diagram schematically illustrating an example of biometric file construction.

The present embodiment is described by way of example in which a first digital data file is a document containing information such as a public encryption key appended with auxiliary data. Auxiliary data may consist of the document originator's ID, a time stamp, type of document and any other data. Hereinafter this file in totality is referred to as a media file 16. As schematically illustrated in FIG. 2, selected contents of a document plus auxiliary data can be implanted into a second digital data file, referred to as a biometric information file 19, which is generated by a registered user so that their identification may be discerned by a recipient from the biometric information file 19. For example, the media file 16 contains the public encryption key 17 of a user and the biometric information file 19 is a video recording made by the same user. These two data files are stored in the database 9 on the server 5 for each registered user 11.

Accordingly, the messaging application 13a of device A 3a includes a file retrieval module 21 for retrieving Bob's media file 16, containing his public key 17, and for retrieving his associated biometric information file 19, from the database 9 of the server 5. The messaging application 13a also includes a data encryption module 23 for encrypted data files 15 using the retrieved public key 17. The messaging application 13b of device B 3b includes a data decryption module 25 for decrypting received encrypted data files 15 using the associated registered user's private key 27. The messaging application 13b also includes a biometric file generation module 31 for generating a biometric file as described below. The registered user's public key 17 and generated associated biometric file 19, as well as the private key 27 may be stored in a memory 4b of the device 3b.

Each messaging application 13 also includes a communications module 33 providing an interface for communication of data therebetween, via the data network 7 and the server 5. It will be appreciated that, although not illustrated, the messaging applications 13a, 13b would also include the complementary data processing modules 17 to both generate the biometric file and retrieve the public key, as well as to both encrypt and decrypt data.

Figure 3:
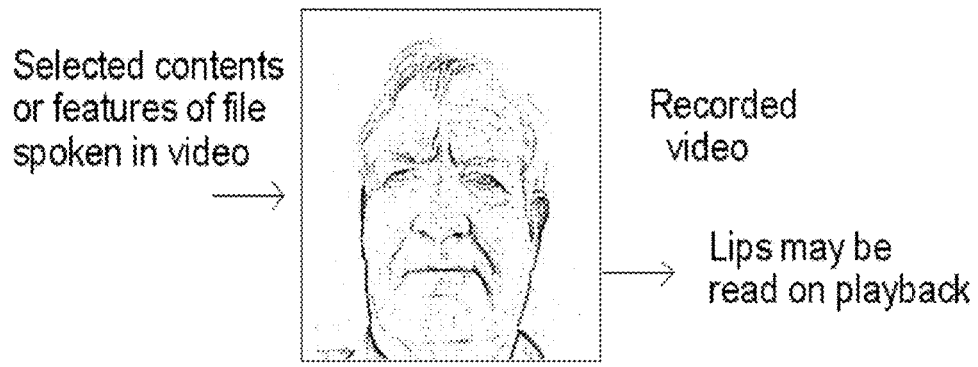
FIG. 3 illustrates an example of a biometric file based on recorded video.

The biometric file generation module 31 can be configured to generate the biometric information file according to one or more of a number of different techniques. For example, the biometric information file may be constructed so as to contain said contents or features of the first digital file. In the present embodiment, as illustrated in FIG. 3, the originator of the digital file, or a trusted person produces a video recording showing his or her face with their lips clearly visible, and enunciates the values of said contents or features. In the present exemplary embodiment, the biometric information file 19 can include a video recording of Bob enunciating a defined portion of his public key, such as the first ten characters. On replay of the video recording, from the images and the audio, the viewer is firstly able to identify the person who is claiming to be the originator and/or owner of the associated media file, and secondly able to discern the said contents or features, namely parts or features of the media file. These identified details may be corroborated with the received media file itself. For example, the messaging application 13 may be configured to prompt the user to input the name of the identified person and some or all of the discerned portion of the public key from the received biometric information file 19. The messaging application 13 can then verify that the user input details matches the respective data of the associated media file, before allowing data to be encrypted using the received public key.

Figure 4:
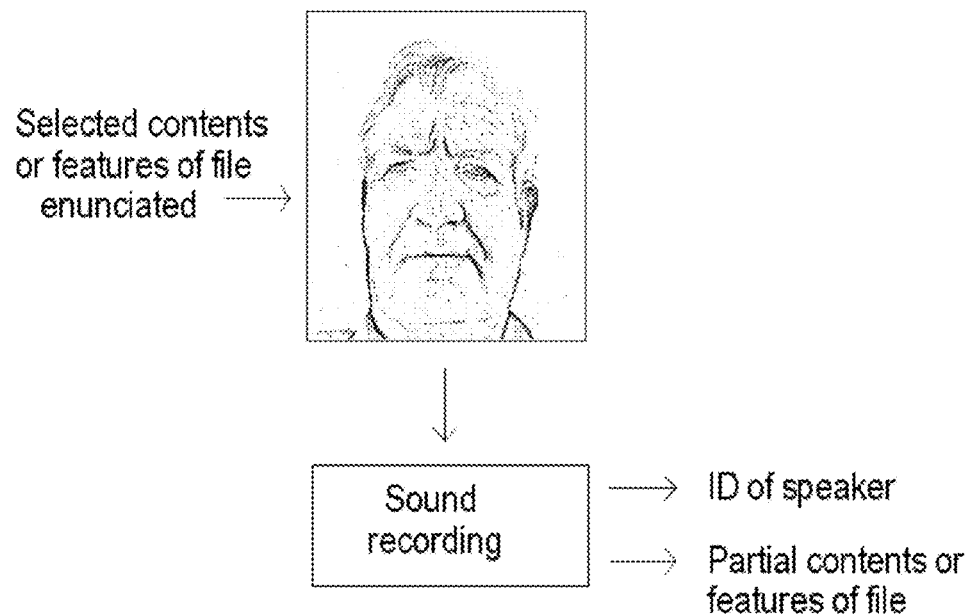
FIG. 4 illustrates an example of a biometric file based on recorded audio.

In an alternative embodiment, the person providing the biometric authentication information, who may be the originator of the media file or a trusted third party, makes a sound recording of themselves describing some of the contents or features of the media file, for example as illustrated in FIG. 4. The recipient of the media file and the biometric file, which is an audio recording in this embodiment, is able to identify the speaker by recognising his or her voice from the received audio recording. The recipient is also able to check and verify that the contents or features described by the speaker in the audio recording are the same as those of the associated media file.

Figure 5:
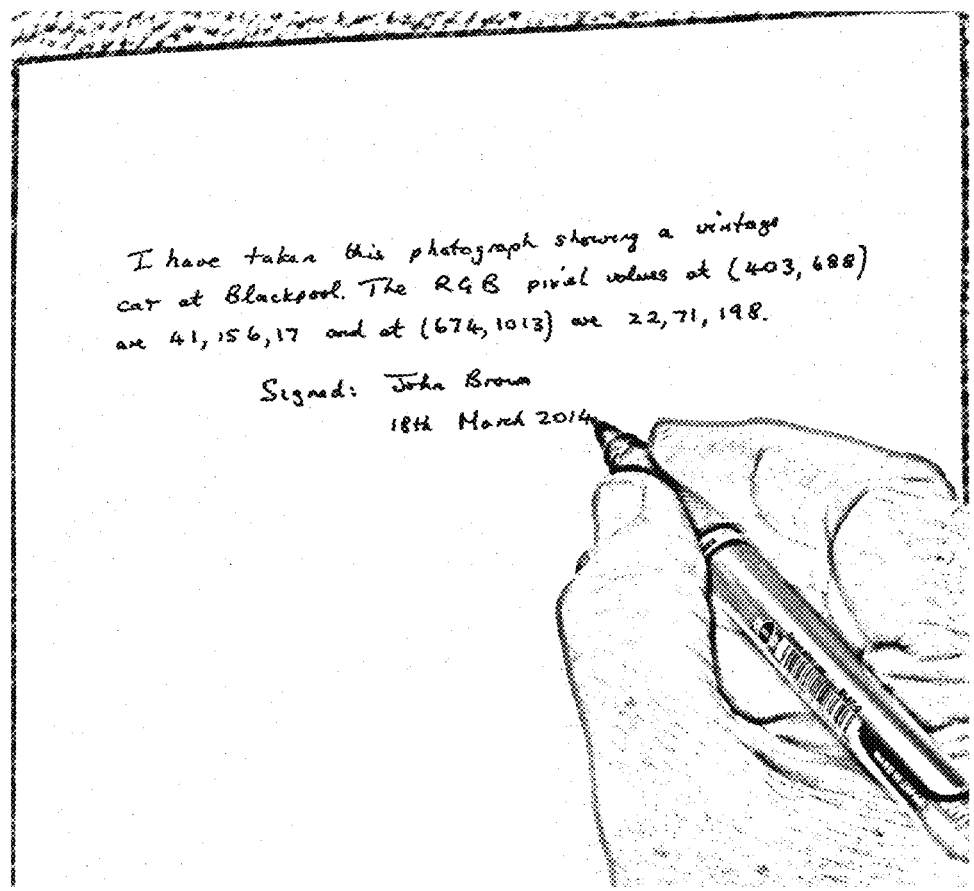
FIG. 5 illustrates an example of a biometric file based on description, replicated values and signature.

In a further alternative embodiment, the biometric information file consists of a video recording or a photograph of the originator, or trusted third party writing down details of the media file and optionally signing his or her name. An example in the case of a media file being a digital photograph is that of the originator writing down some of the pixel values for a number of different pixel coordinates. This is shown in FIG. 5 where the originator has written down the X and Y pixel coordinates followed by the Red, Green and Blue pixel values from the RGB format of the digital photograph. The pixel at 403 pixels from the left side and 688 from the bottom has red value 41, green value 156 and blue value 17 and the pixel at 674 pixels from the left side and 1013 from the bottom has red value 22, green value 71 and blue value 198 as illustrated in FIG. 5, which also includes the originator, or trusted third party signing and dating the document.

Figure 6:
FIG. 6 illustrates an exemplary table of hand gestures alphabet which may be used in biometric file construction.

It is appreciated that other forms and types of biometric information file may be constructed. Some of the contents, features or derived values of the media file may be communicated by means of gestures of the body recorded in the video recording. As an example, signing using a language utilised by hearing-impaired people may be used. FIG. 6 shows an exemplary look up table for hand gestures and letters of the alphabet.

Further Embodiments, Alternatives and Modifications

Further embodiments will now be described using corresponding reference numerals to those of preceding figures where appropriate for corresponding elements.

In an alternative embodiment, instead of communicating directly the contents, features or derived values of the media file in a video recording, sound recording or photograph as described in the embodiment above, the biometric file is constructed whereby the contents, features or derived values of the media file are communicated indirectly, by using a codebook look up table where a prearranged phrase or word is substituted for each phrase, word or character used to represent the contents, features or derived values of the media file. An example is given in the codebook look up table below in Table 1.

TABLE 1

Example of part of a codebook look up table to be used in constructing and decoding the biometric file.

| Input value, word or phrase | Output |
|---|---|
| Photograph | Code A |
| Public encryption key | Code B |
| Secret information | Code C |
| Pixel coordinates | Image violet |
| Pixel values | Flowers |
| Number | Stars |
| 1 | Twig |
| 2 | Root |
| 3 | Branch |
| 4 | Leaf |

Using a secret or undisclosed codebook look up table in the construction of the biometric information file so that only the corresponding entries of the codebook table and not the actual contents, features or derived values of the media file means that these are encrypted or obfuscated in the biometric information file. This makes the forging of a biometric file more difficult.

In yet a further embodiment, a series of biometric files may be constructed and provided by a number of trusted third parties each describing the contents, features or values of a first media file plus the contents, features or values of the associated biometric files in a nested authentication arrangement. This can be useful in cases where the originator of the document is not expected to be known to the intended recipient but a number of trusted third parties are expected to be known to the recipient.

Figure 7A:
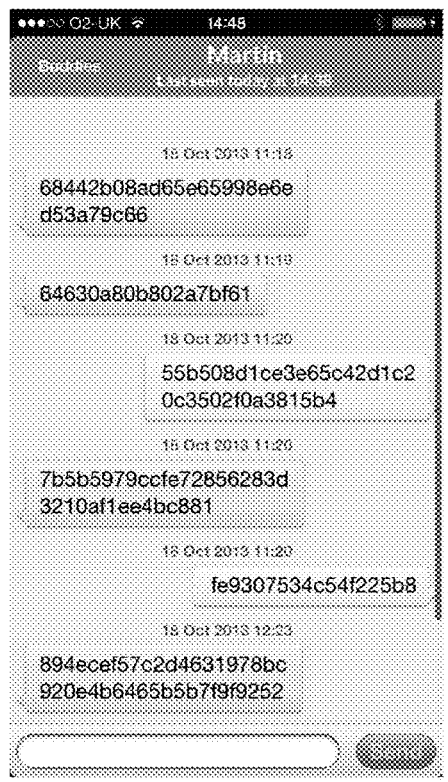
FIGS. 7A and 7B, is an example of received and sent ciphertexts and their corresponding decrypted messages displayed by messaging applications according to an embodiment of the invention.
Figure 7B:
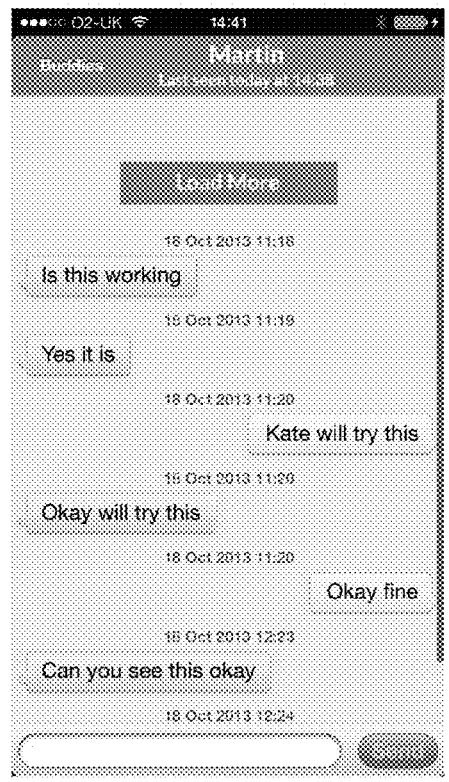
Figure 8:
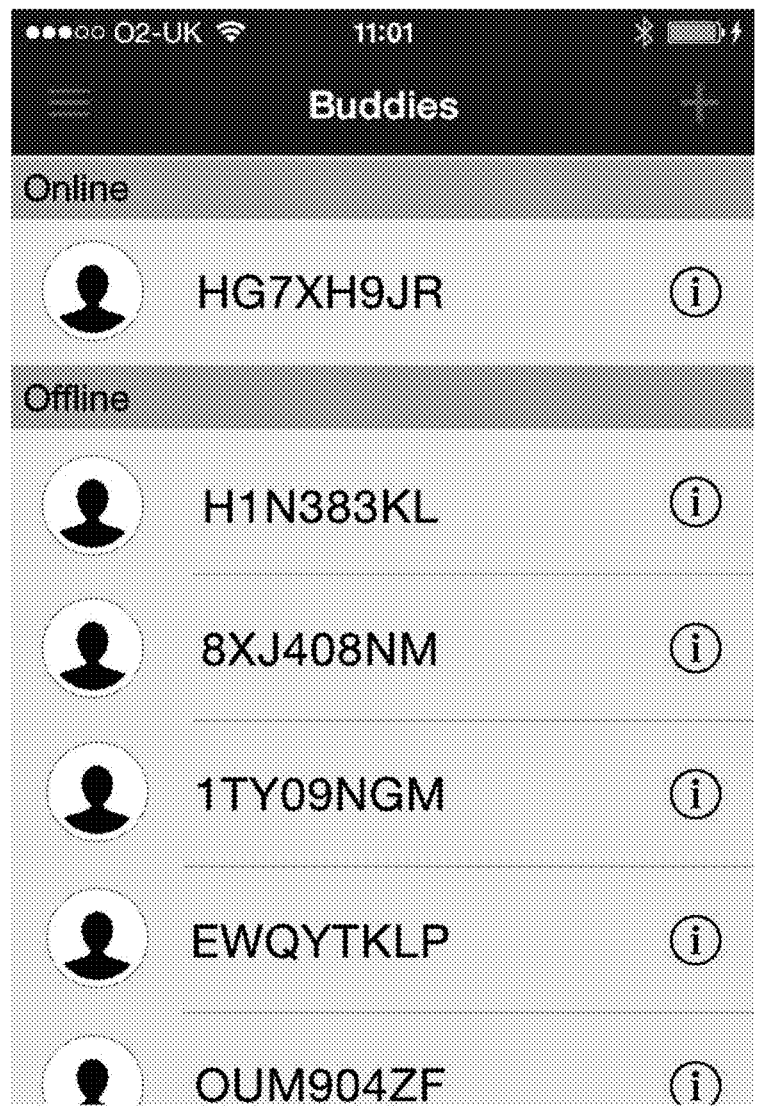
FIG. 8 is an example of a list of random IDs of other users displayed by messaging applications according to an embodiment of the invention, along with associated information symbols which, if permission is granted, enable associated biometric files to be accessed for verification of the true user's identity.

As yet a further embodiment, the invention can be further used to provide identification to what appears to be an anonymous sender ID. The messaging application 13 allows users to send and receive secure messages by encrypting each message using the public keys of the intended recipients. Employing their configured devices 3, the recipients download sent ciphertexts and the messaging application 13 uses their private keys to decrypt the contents of each ciphertext and display each corresponding message. This is illustrated in FIGS. 7A and 7B, which shows the example messages before and after decryption, respectively. A feature of the messaging application 13 is an anonymous mode in which each user is allocated an anonymous, random ID rather than their name, telephone number or email address. The idea is that users are able to invite other users to send each other messages without the risk of follow up communications by traditional means. This is illustrated in FIG. 8 where invited users appear as a list under the heading Buddies, displayed by messaging applications according to this alternative embodiment. It can be seen that the list of contacts have randomly generated IDs.

Providing a sending user has granted their permission by previously sending the recipient the appropriate command, the recipient is able to tap on the information symbol next to the ID, as shown in FIG. 8, which results in the recipient being able to preview the biometric file constructed by the user with that random ID and determine their actual ID. For example if the recipient taps the information symbol next to H1N383KL a video recording made by the user whose random ID is H1N383KL is played to the recipient which identifies the user binding him or her to H1N383KL. In this way, a recipient of a message from a random ID is able to retrieve the associated biometric files for verification of the sender's true identity. It will be appreciated that the biometric information file in this embodiment may be generated by the transmitting entity implanting at least a portion of her public key into the associated biometric information file.

In the embodiments described above, the invention is described in the context of data communicated between messaging applications on respective devices. It is appreciated that the invention can also be implemented in a wide number of different types of applications that enable and/or facilitate secured access to digitally represented information, such as cloud-based information services, internet banking, digital rights management, personal information databases, social networking, point of sale transactions, e-mail applications, secure ticketing, message services, digital broadcasting, digital communications, wireless communications, video communications, magnetic cards and general digital storage.

In a further alternative embodiment, one or more digital files which contain media information such as documents, or numerical data such as encryption keys are aggregated into a single file, termed the source file and a message digest of this source file is calculated. The message digest function used is ideally a cryptographic hash function such as the Secure Hash Algorithm (SHA) [2] with the property that it is practically impossible to generate a different source file with the same hash value as the original. A biometric information file is generated by the originator of the source file or by a trusted third party, likely to be known to the intended recipient of the source file. One or more biometric information files are generated in such a way that all or part of the message digest value is contained within each file. The recipient of a biometric information file and the source file is able to determine the identity of the originator, or trusted third party, and all or part of the message digest value from the biometric information file and check that this corresponds to the calculated message digest of the received source file.

In a further embodiment of the invention the source file is digitally signed by the originator, or by a trusted third party, using a cryptographic key and all or part of the digital signature is contained in a biometric information file.

Figure 9:
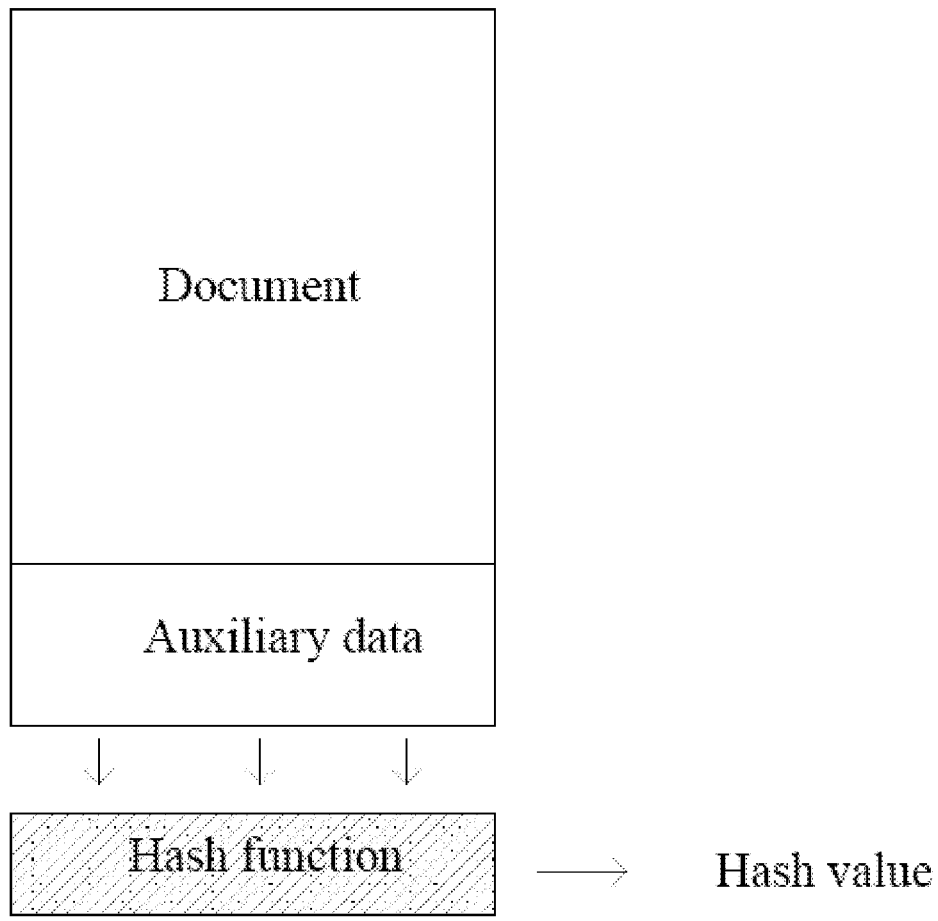
FIG. 9 is a block diagram schematically illustrating another example of biometric file construction.

The invention is described by way of example in which the source file is a document such as a public encryption key appended with auxiliary data. Auxiliary data may consist of the document originator's ID, a time stamp, type of document and any other data. As shown in FIG. 9, a hash function such as the Secure Hash Algorithm (SHA) is used to calculate the message digest value of the document plus auxiliary data. For a particular document and auxiliary data consider that the hash value is denoted by hash value represented as an alphanumeric string. An example is 7km3wa2k9jv8em395m7b3. The partial hash value is denoted as hash value_{partial} and consists of all or part of hash value. Using the same alphanumeric string example the partial hash value, limited to the first 12 characters is 7km3wa2k9jv8.

Figure 10:
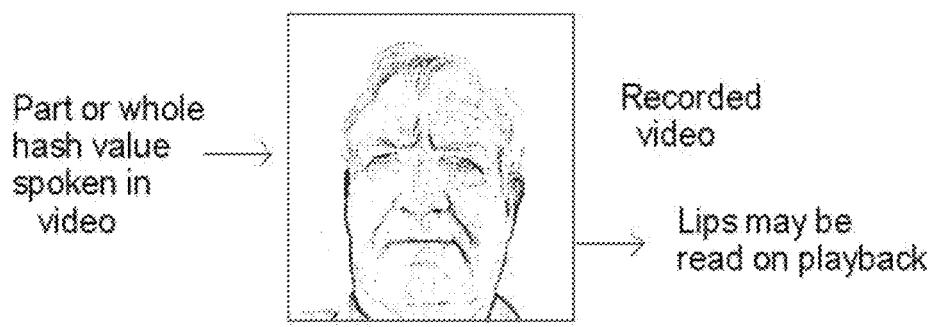
FIG. 10 illustrates another example of a biometric file based on recorded video.

There are a number of different methods in which a biometric information file may contain the partial hash value, hash value_{partial}. In one embodiment, as illustrated in FIG. 10, the originator, or a trusted third party produces a video recording of his/her face with their lips clearly visible, and enunciates the partial hash value so that the partial hash value may be discerned on replay of the video recording. The source file and video recording file are subsequently communicated to the recipient. It is an advantage to encrypt the source file and video recording file prior to communication as this makes tampering more difficult while the files are in transit. The recipient is able to authenticate the ID of the originator, or trusted third party by recognising the person in the video recording by recognising their face, and/or recognising their voice, and/or recognising their gestures, on replay. The recipient is also able to authenticate the source file by calculating the hash value of the source file, forming a partial version, hash value_{partial}, and verifying that this is the same as the hash value_{partial} enunciated in the video recording. If a cryptographic hash function is used it is practically impossible to produce a digital file with a prescribed hash value. It follows that it is practically impossible to produce a fake digital file with the same hash value as the original source file. Further corroboration of the hash value may be provided by reading the lips of and/or by recognising particular voice patterns of the originator, or trusted third party in the video recording to correlate with the spoken hash value_{partial}.

The partial hash value may be communicated by other types of biometric information file. The partial hash value may be communicated by means of gestures of the body recorded in the video recording. As an example, signing using a language utilised by hearing-impaired people may be used. FIG. 6 shows a look up table for hand gestures and letters of the alphabet. Calculating the message digest of the source file using the cryptographic hash function SHA 256 [2] will produce a hash value 256 bits long. As there are 26 letters in the alphabet, a combination of any 3 letters provides a total of 26*26*26=17576 combinations. A lookup table may be constructed by assigning $2^{14}=16384$ of these 3 letter combinations to each of the 16384 different bit patterns of length 14 bits. Correspondingly a hash value_{partial} formed from the first 84 bits of the 256 bit hash value may be represented by 6 three letter sequences, a total of 18 hand gestures. An example of such a hash value_{partial} is the sequence KWY KCO SSP NWF PPE XIG.

Figure 11:
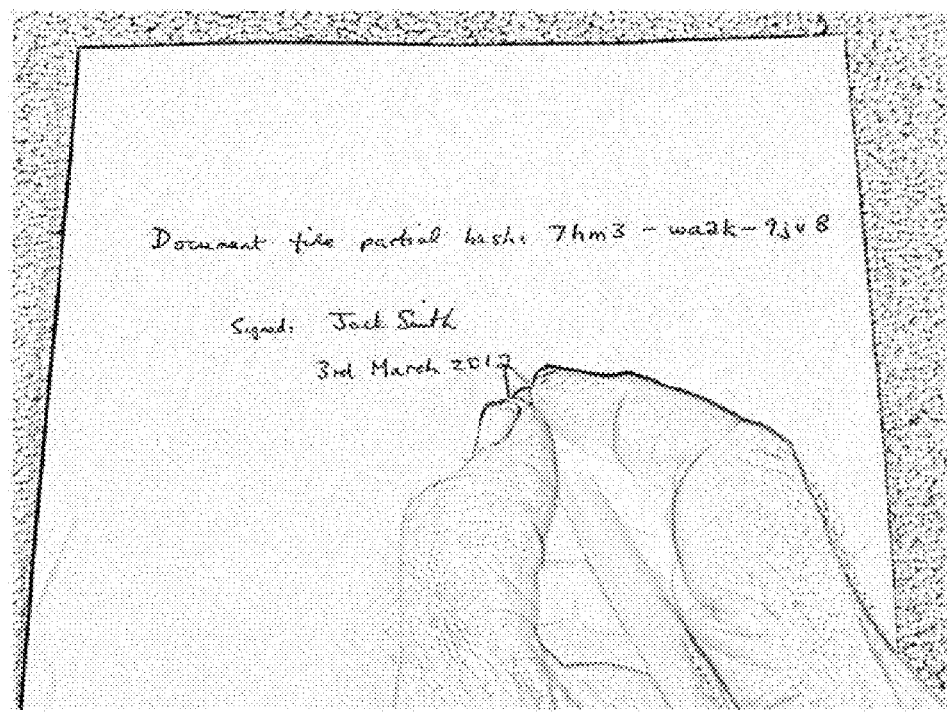
FIG. 11 illustrates an example of a biometric file based on a written version of the hash value.

A biometric information file can also consist of a video recording or photograph of the originator, or trusted third party writing the hash value_{partial} on a piece of paper and may also include the originator, or trusted third party signing and dating the said piece of paper. An illustration of this is shown in FIG. 11.

Figure 12:
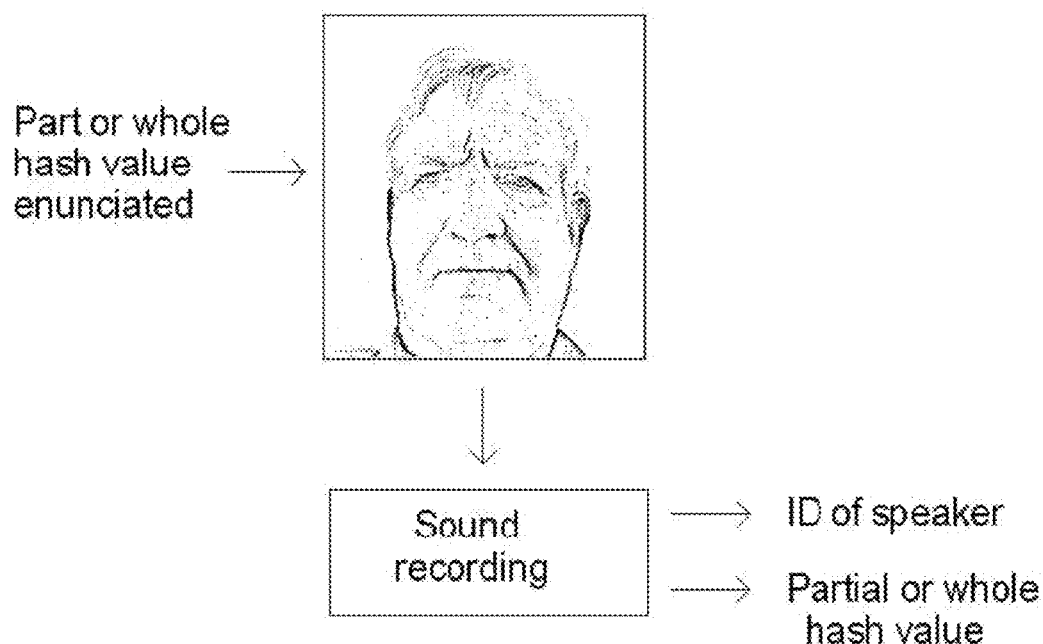
FIG. 12 illustrates another example of a biometric file based on recorded audio.

In another embodiment the person providing the biometric authentication information and this may be the originator of the document file or a trusted third party, makes a sound recording of themselves speaking the partial hash value as illustrated in FIG. 12. Authentication is provided by the recipient calculating the hash value of the document file, deriving the partial hash value, recognising the person's voice in the sound recording and hearing the same partial hash value being spoken by that person in the sound recording.

Figure 13:
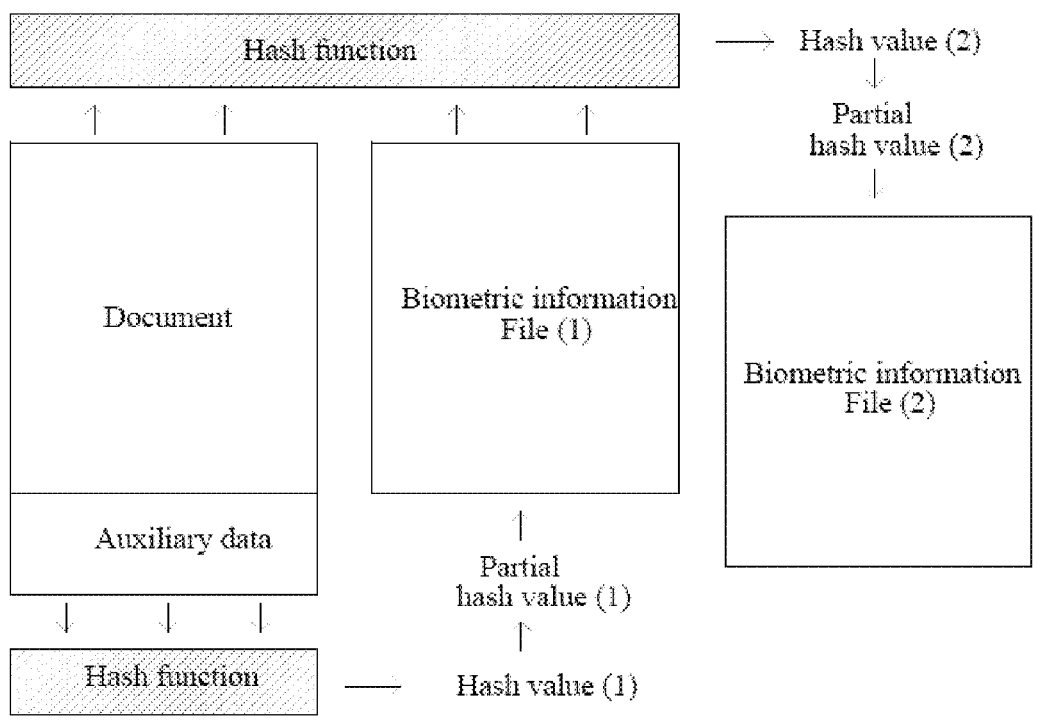
FIG. 13 is a block diagram schematically illustrating construction of a series of biometric files in a nested authentication arrangement.

In a further embodiment additional biometric authentication information may be provided by a series of trusted third parties in a nested authentication arrangement which may be useful in cases where the originator of the document is not expected to be known to the intended recipient. As shown in FIG. 13 the document file and the originator's biometric information containing the hash value_{partial}(1) are combined together and the hash of this composite file is calculated, with the result denoted as hash value (2). The truncated version of this denoted as hash value_{partial}(2) is included in one or more biometric information files produced by the trusted third party. As described above a biometric information file can consist of a video recording of the trusted third party enunciating the hash value_{partial}(2); or communicating the hash value_{partial}(2) value by bodily gestures, including hand gestures; a video recording or photograph of the trusted third party writing the hash value_{partial}(2) on a piece of paper and signing their name; or a sound recording of the trusted third party enunciating the hash value_{partial}(2) or a combination thereof. It is apparent that the nesting procedure may continue resulting in a series of trusted third parties authenticating previously authenticated composite files, producing biometric information files each conveying a hash value_{partial} authenticating the previous composite file so that at the $j^{th}$ step, the $(j-1)^{th}$ trusted third party produces one or more biometric information files (j) each of which include hash value_{partial}(j). This arrangement is similar to the chain-of-trust in Public-Key Infrastructure.

In another embodiment of the invention a digital signature of the source file is generated using the hash value as input to the signature. Part of the digital signature is appended to the source file and the rest of the digital signature is communicated in one or more biometric information files. This embodiment is described by way of example using the RSA digital signature standard given in the Digital Signature Standard [4]. The public key which is used by the recipient to verify the digital signature consist of integers n and e. The private key used by the originator, or trusted third party consists of the integers n and d. The digital signature is a calculated integer given by σ=hash value$^d$ which is split into two parts, $σ_l$ and $σ_r$ such that sigma is equal to $σ_l$ appended with $σ_r$. An example is sigma=8249567123995334 with $σ_l$=82495671239 and $σ_r$=95334. The integer a, is communicated in one or more biometric information files and $σ_l$ is appended to the source file. The reason for subdividing σ into two parts is that typically σ is too large an integer to be communicated practically in a biometric information file. The integer $σ_r$ may be communicated directly as an integer or represented as an alphanumeric string which is usually shorter. The recipient determines the integer $σ_r$ from one or more received biometric files and constructs the integer a using the appended source file and uses the public key to calculate m^=σ$^e$ modulo n. The source file is verified by the digital signature if m^ is equal to hash value calculated by hashing the received source file.

Another method of digitally signing a source file is to use the McEliece public key encryption system [5] with additional features as described in UK patent GB2473154 [6]. This embodiment is described by way of example using a short code length of 32 bits. Practical arrangements may use codes of longer length such as 65536 bits. The public key is a reduced echelon binary generator matrix of a scrambled, permuted Goppa code, an example of length 32 bits is shown below:

```
1 0 0 0 0 0 0 0 0 0 0 0 0 0 1 0 1 1 0 1 0 1 0 1 0 0 0 1 1 1 1 1
0 1 0 0 0 0 0 0 0 0 0 0 0 1 0 0 0 1 0 0 1 0 0 0 1 0 0 1 0 1 1 1 0
0 0 1 0 0 0 0 0 0 0 0 0 0 0 0 1 1 0 0 1 0 1 1 1 1 0 0 1 1 0 0 0 0
```

-continued

```
00010000000111010100001010000100
00001000000001101111010010001001
00000100000001000100110111111101
00000010000011000010110010011001
00000001000011101111110001100111
00000000100000001101001101110011
00000000010010011100101110010100
00000000001000011010101111000111
00000000000100010101011111010110
```

In this example the binary error correcting code has 20 parity bits and 12 information bits and can correct up to 4 errors in any of the 32 bits. The private key consists of the Goppa code used to generate this generator matrix, the scrambler and permutation matrices. Consider that the source file is appended with an integer index and hashed using a secure hash function such as SHA256 producing a hash value whose first 20 bits are:

01001011110010110011

The originator, or trusted third party, uses their private key, considering the 20 bit pattern as a syndrome of the error correcting Goppa code, to find the 4 bit error pattern which produces this syndrome value. This code can correct 4 bit errors so a 4 bit error pattern is determined. In general Goppa codes are represented as an (n,k,t) code and a t bit error pattern is determined. Returning to the example, it is found that errors in the 2nd, 7th, 24th and 30th bit positions produces a syndrome equal to

01001011110010110011

This may be verified by determining the parity bits from the generator matrix above for an input vector with 1's in the error positions:

01000010000000000000000100000100

It is found that the 20 parity bits are:

01001011110010110011

The same as the first 20 bits of the hash value.

Having found the error pattern using the private key, the originator, or trusted third party, produces a biometric information file which contains the information of the bit error positions. For example the originator, or trusted third party could produce a video recording of themselves enunciating the numbers 2, 7, 24 and 30.

The recipient receives the source file, the index value and one or more biometric information files. From the biometric information files, the recipient determines the digital signature, which is the numbers 2, 7, 24 and 30 and checks the ID of the person doing the authentication. The recipient then uses the public key, the generator matrix to calculate the syndrome for bit errors in positions 2, 7, 24 and 30. The recipient appends the source file with the index value and uses the hash function SHA256 to determine the hash value. The recipient determines that the digital signature is valid if the first 20 bits of the hash value is equal to the calculated syndrome.

The basis of this digital signing method is that it is practically impossible to determine an error pattern from a syndrome unless it is known from the huge number of possibilities which particular Goppa code was used to construct the generator matrix. That is, it is practically impossible unless the private key is known. However given the digital signature, the error pattern, it is straightforward to calculate the syndrome.

To construct the digital signature it is necessary to have an integer index appended to the source file because not all syndrome values correspond to error patterns that the Goppa code can correct. In practice different index values are tried until a correctable syndrome is found.

A more realistic example uses a Goppa code with parameters (131072,130987,11) which can correct 5 errors. With these parameters, the syndrome is 85 bits long giving an 85 bit digital signature and on average 120 different index values need to be tried by the signer before a correctable error pattern is found.

In another embodiment the person providing the biometric authentication information instead of communicating directly the partial hash value or partial digital signature in a video recording or sound recording, the partial hash value or partial digital signature is communicated indirectly using a codebook look up table where a prearranged phrase or word is substituted, or used in addition, for each character or symbol representing the partial hash value or partial digital signature. As an example for a partial hash value represented as an alphanumeric string qn4c5te9.

The codebook look up table may be as in Table 2 below.

TABLE 2

Codebook look up table

| Character | Phrase |
| --- | --- |
| 4 | The sky is blue |
| 5 | A fast train |
| 9 | Marigolds and daisies |
| ... | ... |
| c | A tasty dish |
| e | Two rounds of golf |
| n | A relaxing holiday |

Although this results in larger biometric information files, the increased redundancy reduces the risk of error by the recipient in determining the partial hash value or partial digital signature. It also makes the task of forging a biometric information file that much harder. Using a secret look up table and communicating in the biometric information files only the corresponding phrases of the codebook table and not the characters making up the partial hash value or partial digital signature effectively means that the partial hash value or partial digital signature is encrypted before being communicated in a biometric information file. Again this makes the forging of a biometric file more difficult.

Figure 16:
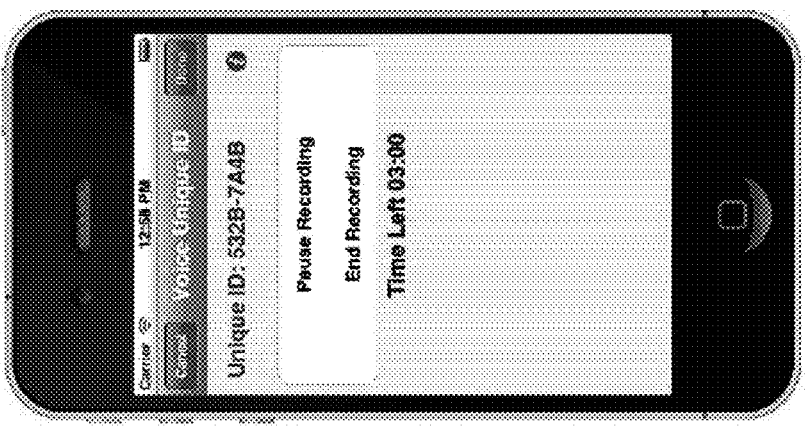
FIGS. 14, 15, and 16 are further example screens displayed by a mobile application according to an alternative embodiment.
Figure 15:
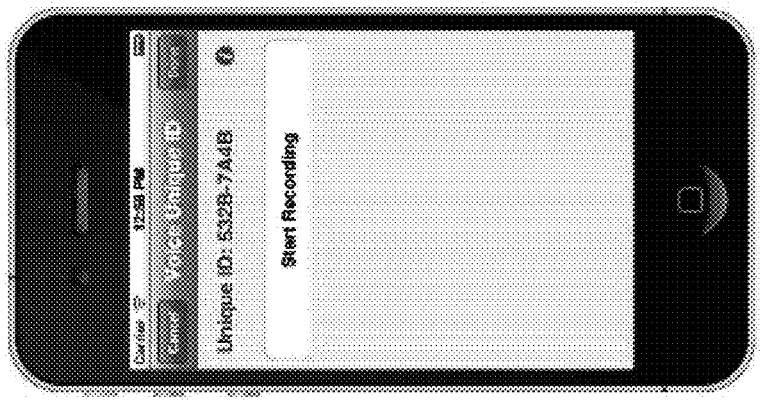
Figure 14:
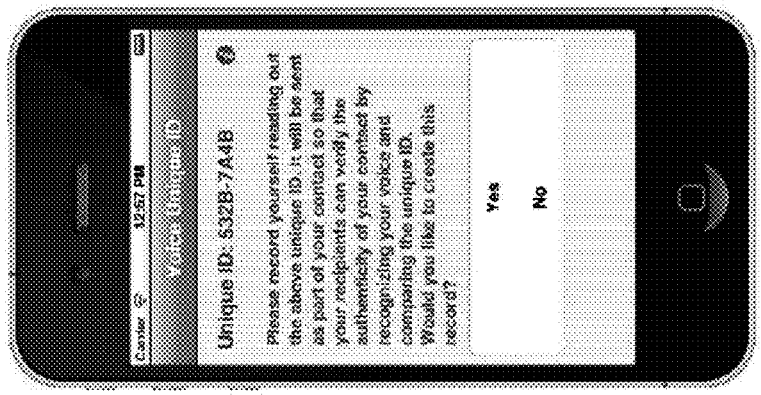

One example of using the invention to authenticate a public encryption key is given by an iPhone App. The App allows users to share digital files securely by encrypting each file using the public keys of the intended recipients and storing the resulting ciphertexts in a cloud type server. Using their iPhones, the recipients download the ciphertexts and the App uses their private keys to decrypt the contents of the ciphertexts for display, local storage or for hand off to a PC or other device. A critical part of the secure operation of the App is the distribution of each user's public encryption key to a user's contacts and the authentication of the binding of a user's ID to their public key. During setup the App generates a public encryption key for each user and the partial hash value of the key is presented to the user who is invited to make an audio recording identifying himself/herself and enunciating the partial hash value as shown in FIG. 14. In the App the partial hash value is called Unique ID. The user starts the voice recording as shown in FIG. 15, and after recording their voice establishing their ID and including the spoken Unique ID (partial hash value) the user ends the recording as shown in FIG. 16. The public key together with the voice recording are sent to each contact of the user. Each contact on receiving the public key together with the voice recording is invited by the App to listen to the recording, to identify the speaker and to verify that the spoken Unique ID (partial hash value) is identical to the Unique ID (partial hash value) which the App locally calculates from the received public encryption key. Only if the authentication is satisfied does the contact user authorise the App to store the ID and associated public encryption key for future secure sharing of information.

It is apparent that the App could generate other biometric information files such as a video recording as described above as further proof of authentication.

In summary, the invention may be used in a wide number of different applications for access to digitally represented information such as cloud based information services, internet banking, digital rights management, personal information databases, social networking, point of sale transactions, e-mail applications, secure ticketing, message services, digital broadcasting, digital communications, wireless communications, video communications, magnetic cards and general digital storage.

In the embodiments described above, the devices store application modules (also referred to as computer programs or software) in memory, which when executed, enable the respective device to implement aspects of embodiments of the present invention as discussed herein. As those skilled in the art will appreciate, the software may be stored in a computer program product and loaded into the mobile device using any known instrument, such as removable storage disk or drive, hard disk drive, or communication interface, to provide some examples.

The invention may be implemented on a number of different hardware platforms and devices using custom integrated circuits, Field Programmable Gate Arrays, special and general purpose processors using firmware and/or software.

It will be understood that embodiments of the present invention are described herein by way of example only, and that various changes and modifications may be made without departing from the scope of the invention. Alternative embodiments may be envisaged, which nevertheless fall within the scope of the following claims.

REFERENCES

[1] R. Graubart and B. Abramowitz, *Voice signature with strong binding*, U.S. Pat. No. 7,606,768 B2, October 2009
[2] A. J. Menezes, P. C. van Oorschot and S. A. Vanstone, *Handbook of Applied Cryptography*, CRC Press, ISBN 0-8493-8523-7
[3] R. Rivest, A. Shamir, L. Adleman, *A Method for Obtaining Digital Signatures and Public-Key Cryptosystems*, Communications of the ACM 21 (2), pp. 120-126, 1978
[4] FIPS PUB 186-3, *Digital Signature Standard (DSS)*, Federal Information Processing Standards Publication.
[5] R. J. McEliece, *A Public-Key Cryptosystem based on Algebraic Coding Theory*, DSN Progress Report 42-44, 1978.
[6] M. Tomlinson and C. J. Tjhai, *Public key encryption system using error correcting codes*, UK Patent GB2473154, November 2010.

The invention claimed is:

1. A method of authenticating a digital data file associated with an originator of the digital data file, the method comprising:
deriving information from at least a portion of the digital data file using a predefined function;
generating authentication data providing an irrevocable binding of the digital data file to at least one biometric characteristic of the associated originator, by:
prompting the originator to record biometric input of the derived information; and
capturing audio and/or image data of the biometric input of the derived information by the originator in response to the prompting, wherein the derived information is implanted into the captured audio and/or image data; and
transmitting, over a data network, the digital data file and the associated generated authentication data to a recipient,
whereby the implanted information and the at least one biometric characteristic of the associated originator are verified from an output of the generated authentication data,
wherein the derived information comprises encoded data derived from the digital data file using a codebook look up table, where a symbol or sequence of symbols is used to describe said content.

2. A method according to claim 1, wherein the authentication data comprises one or more captured images of a person communicating said derived information.

3. A method according to claim 1, wherein said digital data file is a public encryption key, and wherein a defined portion of said public encryption key is implanted into said authentication data.

4. A method according to claim 3, further comprising verifying the implanted portion of the public encryption key and the identity of the originator associated with the public encryption key from said received authentication data, before allowing encryption of data using said received public encryption key.

5. A method according to claim 4, wherein the encrypted data comprises electronic data messages transmitted between respective messaging applications of host devices.

6. A method according to claim 5, wherein the authentication data is generated using a microphone and/or camera of the host device to record the derived information.

7. A method according to claim 1, wherein the authentication data is stored in a server for retrieval by the recipient of the associated digital data file.

8. A method according to claim 1, wherein said digital data file comprises the authentication data used for authentication, to form a nested authentication arrangement whereby successive trusted third parties provide authentication data which may be used to provide additional authentication.

9. A method according to claim 1, further comprising masking the identity of an entity transmitting an electronic data message to a receiving entity, by:
generating a random identifier for the transmitting entity;
linking the random identifier to associated authentication data for the transmitting entity;
transmitting a data message to the receiving entity, the data message including the random identifier;
displaying the received encrypted data message and the associated random identifier; and
outputting the authentication data associated with the random identifier, from which the identity of the transmitting entity is determined.

10. The method of claim 9, wherein the authentication data is retrieved from a remote server.

11. The method of claim 10, wherein the transmitted data message is a data message encrypted using the receiving entity's public key, and wherein the authentication data is generated by the transmitting entity implanting at least a portion of the public key into the authentication data.

12. A method according to claim 1, wherein the derived information is communicated to the recipient indirectly, by encrypting or obfuscating the derived information, and capturing audio and/or image data of the biometric input of the encrypted or obfuscated information.

13. A method according to claim 12, wherein the derived information is implanted into the authentication data by enunciating or writing said derived information, or by hand or body gestures representative of said derived information.

14. A system for authenticating a digital data file associated with an originator of the digital data file, the system comprising at least one hardware processor which executes:
   a deriving unit configured to derive information from at least a portion of the digital data file using a predefined function;
   a generating unit configured to generate authentication data providing an irrevocable binding of the digital data file to at least one biometric characteristic of the associated originator, by:
   prompting the originator to record biometric input of the derived information; and
   capturing audio and/or image data of the biometric input of the derived information by the originator in response to the prompting, wherein the derived information is implanted into the captured audio and/or image data; and
   a transmitting unit configured to transmit, over a data network, the digital data file and the associated generated authentication data to a recipient, whereby the implanted information and the at least one biometric characteristic of the associated originator are verified from an output of the generated authentication data,
   wherein the derived information comprises encoded data derived from the digital data file using a codebook look up table, where a symbol or sequence of symbols is used to describe said content.

15. A non-transitive computer-readable storage medium storing computer-executable instructions to perform a method of:
   deriving information from at least a portion of a digital data file using a predefined function;
   generating authentication data providing an irrevocable binding of the digital data file to at least one biometric characteristic of an associated originator of the digital data file, by:
   prompting the originator to record biometric input of the derived information; and
   capturing audio and/or image data of the biometric input of the derived information by the originator in response to the prompting, wherein the derived information is implanted into the captured audio and/or image data; and
   transmitting, over a data network, the digital data file and the associated generated authentication data to a recipient, whereby the implanted information and the at least one biometric characteristic of the associated originator are verified from an output of the generated authentication data,
   wherein the derived information comprises encoded data derived from the digital data file using a codebook look up table, where a symbol or sequence of symbols is used to describe said content.

* * * * *